(12) United States Patent
Sakurai et al.

(10) Patent No.: US 7,509,206 B2
(45) Date of Patent: Mar. 24, 2009

(54) ELECTRONIC CONTROL UNIT FOR AUTOMOBILES AND OUTPUT DRIVER CIRCUIT USED IN THE SAME

(75) Inventors: Kohei Sakurai, Chiyoda-ku (JP);
Nobuya Kanekawa, Chiyoda-ku (JP);
Shoji Sasaki, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 654 days.

(21) Appl. No.: 10/801,859

(22) Filed: Mar. 17, 2004

(65) Prior Publication Data

US 2004/0230347 A1 Nov. 18, 2004

(30) Foreign Application Priority Data

May 14, 2003 (JP) .............................. 2003-135632

(51) Int. Cl.
*G06F 17/00* (2006.01)
*B60L 3/00* (2006.01)
*G06F 7/00* (2006.01)

(52) U.S. Cl. ............................. 701/99; 701/1; 701/36; 307/9.1; 307/10.1

(58) Field of Classification Search ............... 701/99, 701/104, 105, 115, 1, 29, 36; 123/480, 339.14; 388/829, 831, 858; 377/2, 9, 106; 307/9.1, 307/10.6, 11, 38, 42, 412

See application file for complete search history.

(56) References Cited

U.S. PATENT DOCUMENTS 4,933,862 A * 6/1990 Wataya ........................ 701/105

| | | | |
|---|---|---|---|
| 4,989,150 A * | 1/1991 | Tazawa | 701/101 |
| 5,263,450 A | 11/1993 | Hashimoto et al. | |
| 5,775,296 A | 7/1998 | Goeras et al. | |
| 6,845,315 B2 * | 1/2005 | Hashimoto et al. | 701/114 |
| 6,999,869 B1 * | 2/2006 | Gitlin et al. | 701/115 |
| 7,126,463 B2 * | 10/2006 | Bauerle et al. | 340/453 |
| 2002/0029098 A1 * | 3/2002 | Sakurai et al. | 701/1 |

FOREIGN PATENT DOCUMENTS

| DE | 19610609 A1 | 9/1997 |
|---|---|---|
| EP | 0943909 A1 | 9/1999 |
| JP | 09-154181 | 6/1997 |
| JP | 2000-257501 A | 9/2000 |

OTHER PUBLICATIONS

European Search Report dated Oct. 20, 2006 (Three (3) pages).
Japanese office action dated Aug. 28, 2007 with its English translation.

* cited by examiner

*Primary Examiner*—Thomas G Black
*Assistant Examiner*—Christine M Behncke
(74) *Attorney, Agent, or Firm*—Crowell & Moring LLP

(57) ABSTRACT

The microcomputer 1 operates a control signal for controlling the state of an automobile on the basis of an input signal from a sensor. The output driver ICs 2A and 2B include the output driver 22 having power transistors in correspondence to a plurality of channels, the serial communication interface 23 for executing serial communication with the microcomputer, and the timer circuits 20A and 20B for generating a pulse width modulation signal and a pulse signal and are structured as a semiconductor circuit with these units integrated. The timer circuits 20A and 20B, on the basis of a control data signal received from the microcomputer by the serial communication interface 23, generates a pulse width modulation signal and a pulse signal.

7 Claims, 8 Drawing Sheets

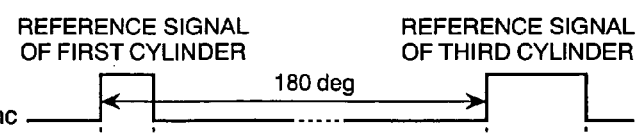
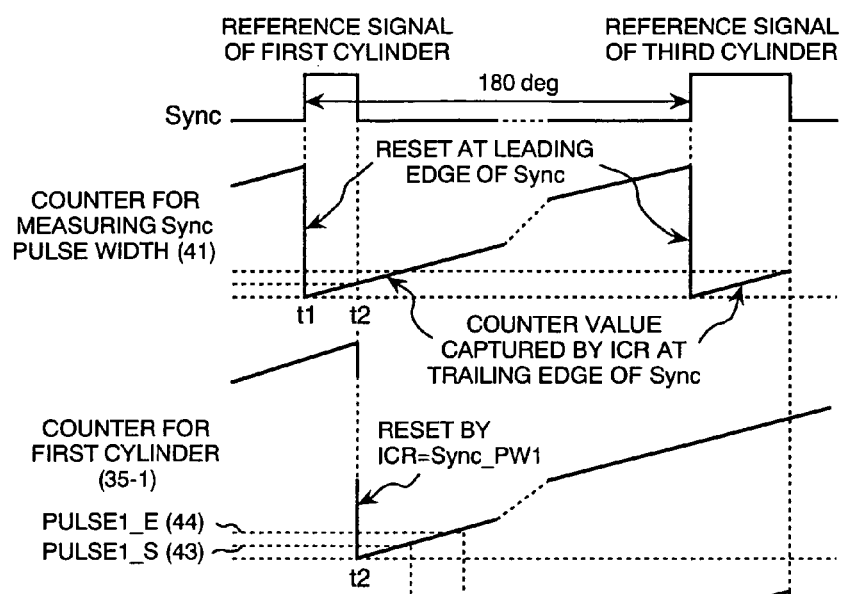
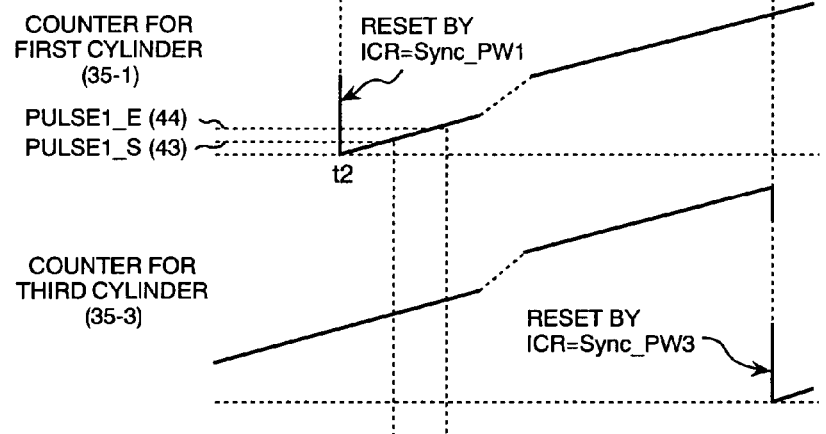
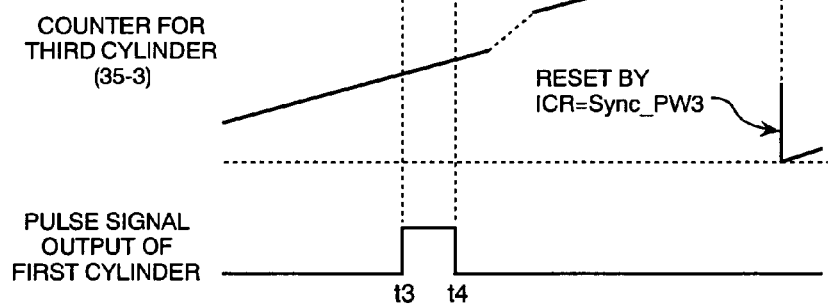
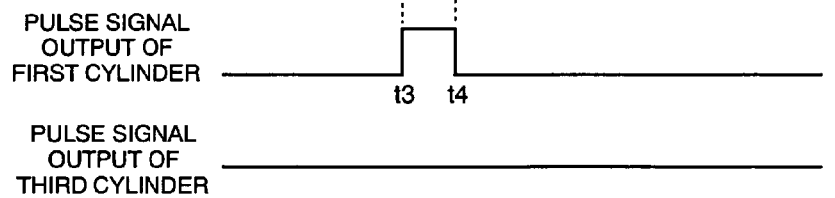

ELECTRONIC CONTROL UNIT FOR AUTOMOBILES AND OUTPUT DRIVER CIRCUIT USED IN THE SAME

FIELD OF THE INVENTION

The present invention relates to an electronic control unit for automobiles and an output driver circuit used in it and more particularly to an electronic control unit for automobiles and an output driver circuit used in it which are suitable for control using a PWM signal and a pulse signal.

BACKGROUND OF THE INVENTION

Generally, an electronic control unit for automobiles is composed of a microcomputer and an output driver circuit. The microcomputer drives the output driver circuit so as to obtain an optimal driving state and controls various actuators on the basis of input signals from various sensors.

In this case, a power transistor such as a power MOSFET is used for the output driver circuit. A gate terminal is turned on or off according to a drive signal from the microcomputer and a desired current is supplied to the load of the actuator connected to a drain terminal. The drive signal from the microcomputer depends on the actuator and for example, in an electronic control unit for an engine, a pulse width modulation (PWM) signal for a valve switching solenoid, a pulse signal synchronized with engine rotation for an injector or an igniter, and a high or low signal according to on or off for a relay switch are general.

In recent years, a driver IC that power MOSFETs are integrated in correspondence to a plurality of channels and moreover serial communication interfaces are formed in one chip has been used for the output driver circuit. By use of such a driver IC, an on-off signal for driving a relay switch can be transmitted to the driver IC from the microcomputer via a serial communication line. A PWM signal and a pulse signal are individually generated for each actuator by a timer module built in the microcomputer and these signals are individually transmitted to the driver IC.

However, in a system that a PWM signal and a pulse signal are individually transmitted from the microcomputer for each actuator, a problem arises that many wires are required between the microcomputer and the driver IC. When the number of wires is increased, the circuit substrate area is increased and the miniaturization of the electronic control unit is restricted. Further, since the number of timer ports of the microcomputer is increased, another problem arises that the cost of the microcomputer package is increased.

Therefore, for example, as disclosed in Japanese Laid-open Patent Publication No. Hei 09-154181, it is known that an operation means 301 and a drive means 302 are connected by an interface means 103, thus the number of wires between the operation means 301 and the drive means 302 can be reduced. Further, in this example, it is unknown whether the operation means 301 and the drive means 302 are arranged in the same electronic control unit or not.

SUMMARY OF THE INVENTION

However, in the electronic control unit disclosed in Japanese Laid-open Patent Publication No. Hei 09-154181, a microcomputer 302C is not loaded in the drive means 302, so that the drive means 302 cannot be applied to the driver IC as it is. The reason is that building-in of a large-scale circuit such as a CPU in the driver IC is not suited to the process of a power semiconductor for producing the driver IC and the development man-power of a program is increased.

An object of the present invention is to provide an electronic control unit for automobiles having a driver IC capable of reducing the number of wires from a microcomputer and moreover driving an actuator without having a built-in microcomputer and the driver IC used in it.

(1) To accomplish the above object, the present invention provides an electronic control unit for automobiles comprising a microcomputer for operating a control signal for controlling the state of an automobile on the basis of an input signal from a sensor and an output driver circuit for driving an actuator by the control signal obtained by the microcomputer, wherein the output driver circuit is composed of power transistors in correspondence to a plurality of channels, a serial communication interface for executing serial communication with the microcomputer, and a driver IC which is a semiconductor circuit having integrated timer circuits for generating a pulse width modulation signal and a pulse signal and the timer circuit, on the basis of the control data signal received from the microcomputer by the serial communication interface, generates the pulse width modulation signal and pulse signal.

By use of such a constitution, the number of wires from the microcomputer can be reduced and the driver IC can drive the actuator without having a built-in microcomputer.

(2) In the item (1) aforementioned, it is preferable that the microcomputer supplies a clock signal for timer count to the timer circuit built in the driver IC and the timer circuit, on the basis of a control data signal for setting the frequency and duty of said pulse width modulation signal transmitted from said microcomputer, generates a pulse width modulation signal.

(3) In the item (1) aforementioned, it is preferable that the microcomputer supplies an engine rotation synchronized signal generated on the basis of a clock signal for timer count and signals of a crank angle sensor and a cam angle sensor to the timer circuit built in the driver IC and the timer circuit generates, on the basis of a control data signal received from the microcomputer by the serial communication interface, generates the pulse width modulation signal and pulse signal.

(4) In the item (3) aforementioned, it is preferable that the aforementioned engine rotation synchronized signal is a pulse signal indicating that the piston of each cylinder of the engine is positioned at a specific reference point and the pulse width of the signal depends on the cylinder number.

(5) In the item (1) aforementioned, it is preferable that the microcomputer supplies a clock signal for timer count to the timer circuit built in the driver IC and the timer circuit, on the basis of an input crank angle sensor signal and cam angle sensor signal, discriminates the position of each cylinder of the engine and on the basis of a control data signal for setting the frequency and duty of the pulse width modulation signal transmitted from the microcomputer, generates a pulse width modulation signal.

(6) In the item (5) aforementioned, it is preferable that the timer circuit built in the driver IC has a register for storing the specification for the pulse patterns of the crank angle sensor signal and cam angle sensor signal.

(7) In the item (1) aforementioned, it is preferable that the driver IC additionally has an integrated A-D converter, converts a sensor signal to a digital signal by the A-D converter, and transmits the conversion result to the microcomputer via the serial communication.

(8) In the item (1) aforementioned, it is preferable that the electronic control unit, in addition to the aforementioned driver IC, has an A-D conversion IC composed of an A-D converter and a serial communication interface and transmits the A-D conversion result by the A-D converter to the microcomputer via the serial communication.

(9) To accomplish the above object, according to the present invention, an output driver circuit for driving an actuator by a control signal obtained by a microcomputer for operating a control signal for controlling the state of an automobile on the basis of an input signal from a sensor comprises power transistors in correspondence to a plurality of channels, a serial communication interface for executing serial communication with the microcomputer, and a driver IC which is a semiconductor circuit having integrated timer circuits for generating a pulse width modulation signal and a pulse signal, and the timer circuit, on the basis of the control data signal received from the microcomputer by the serial communication interface, generates the pulse width modulation signal and pulse signal.

By use of such a constitution, the number of wires from the microcomputer can be reduced and the driver IC can drive the actuator without having a built-in microcomputer.

BRIEF DESCRIPTION OF THE DRAWINGS

FIG. 5 is a timing chart showing the generation operation of a pulse output signal by the timer circuit 20B of the electronic control unit for automobiles of the first embodiment of the present invention;

DETAILED DESCRIPTION OF THE PREFERRED EMBODIMENTS

The constitution of the electronic control unit for automobiles relating to the first embodiment of the present invention will be explained below with reference to FIGS. 1 to 5. Here, the electronic control unit for automobiles will be explained by referring to an example suitable for engine control.

Firstly, by referring to FIG. 1, the whole constitution of the electronic control unit for automobiles of this embodiment will be explained.

Figure 1:
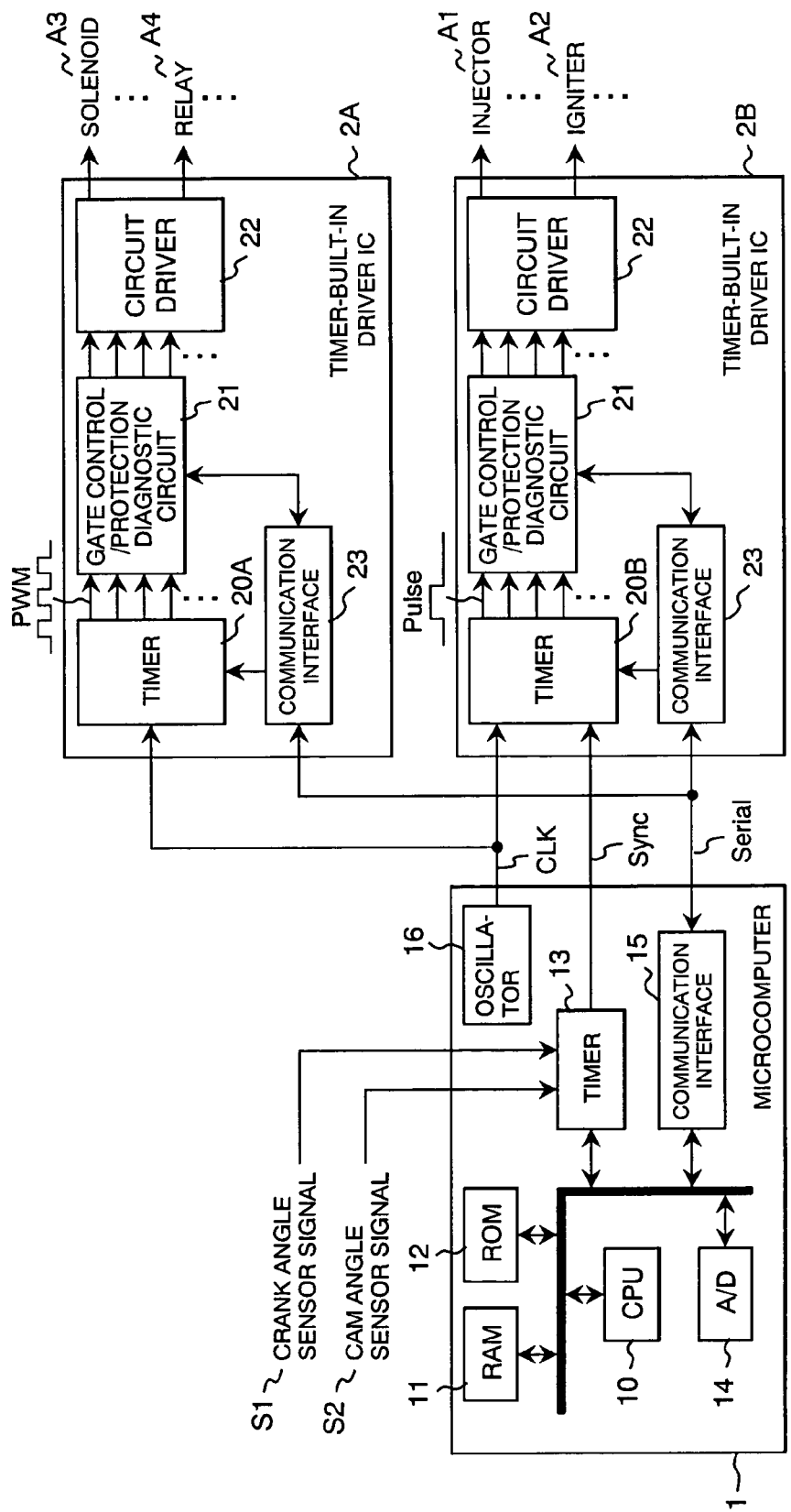
FIG. 1 is a block diagram showing the constitution of the electronic control unit for automobiles of the first embodiment of the present invention.

FIG. 1 is a block diagram showing the constitution of the electronic control unit for automobiles of the first embodiment of the present invention.

The electronic control unit for automobiles of this embodiment has a microcomputer 1 and two driver ICs 2A and 2B which is an output driver circuit. Further, the other constituent parts such as an input circuit and a power source circuit are omitted. Further, a general electronic control unit for engine control uses three or four driver ICs. However, here, only two driver ICs are shown in the drawing.

The microcomputer 1 has a CPU 10, a RAM 11, a ROM 12, a timer 13, an A-D converter 14, a serial communication interface 15, and an oscillator 16.

To the CPU 10, sensor signals such as an intake air amount, an intake pressure, and an accelerator opening are input. The CPU 10, according to a program built in the ROM 12, on the basis of a plurality of input sensor signals, controls an injector A1, an igniter A2, a solenoid A3, and a relay switch A4. Here, a signal for driving the solenoid A3 is a pulse width modulation (PWM) signal, and signals for driving the injector A1 and the igniter A2 are pulse signals in synchronization with engine rotation, and a signal for driving the relay switch A4 is a high or low signal according to on or off.

The CPU 10 transmits control data signals for driving the injector A1, the igniter A2, the solenoid A3, and the relay switch A4 to a serial communication interface 23 for the driver ICs 2A and 2B via the serial communication interface 15.

The timer 13, on the basis of an input crank angle sensor signal S1 and an input cam angle sensor signal S2, discriminates the piston position of each cylinder of the engine. The timer 13, on the basis of the discriminated piston position of each cylinder, outputs an engine rotation synchronization signal (Sync signal) for deciding the timing of fuel injection or ignition and the rotation synchronization signal is supplied to a timer circuit 20B of the driver IC 2B.

The oscillator 16 outputs a clock signal (CLK signal) as a reference signal and the clock signal is supplied to a timer circuit 20A of the driver IC 2A and the timer circuit 20B of the driver IC 2B.

The driver IC 2A is an integrated semiconductor circuit (semiconductor IC) having the timer circuit 20A, a gate control/protection diagnostic circuit 21, an output driver 22, and a serial communication interface 23.

The timer circuit 20A, on the basis of a control data signal for driving the solenoid A3 which is transferred from the microcomputer 1 via the serial communication interface 15 and the serial communication interface 23, generates a PWM signal for driving the solenoid A3. Further, detailed constitution of the timer circuit 20A will be described later by referring to FIG. 2.

The gate control/protection diagnostic circuit 21 supplies a PWM signal outputted by the timer circuit 20A to the output driver 22 and controls the gate terminals of the power transistors constituting the output driver 22. Further, the gate control/protection diagnostic circuit 21 diagnoses a ground fault, an equipment fault, and disconnection of the driver IC 2B, an excess current flowing in the power transistors, and an over-temperature of the power transistors. These diagnostic results are written into a transmission buffer of the serial communication interface 23 which is not shown in the drawing and then are notified to the microcomputer 1 via the serial communication interface 15. Furthermore, the gate control/protection diagnostic circuit 21, when an over-temperature is detected, interrupts the power supply to the power transistors to protect the circuit.

The output drivers 22 is integrated power transistors such as power MOSFETs in correspondence to a plurality of channels. A PWM signal for driving the solenoid A3 and a high or low signal for driving the relay switch A4 are supplied to the power supply gate terminals to the power transistors of the output driver 22 and supplied to the solenoid A3 and the relay switch A4. For the solenoid A3 driven by the output driver 22, for example, a switching valve whose opening is controlled by on-duty of a PWM signal like an EGR valve is available. Further, for the relay switch A4 driven by the output driver 22, for example, an indicator lamp of an instrument panel of an automobile which is turned on or off by a high or low signal is available.

The serial communication interface 23 communicates with the microcomputer 1 via the serial communication interface 15. As mentioned above, the diagnostic results by the gate control/protection diagnostic circuit 21 are transmitted to the microcomputer 1. Further, the control data signal for driving the solenoid A3 and the relay switch A4 which is transmitted from the microcomputer 1 is received by the serial communication interface 23 and stored once in the internal buffer. The timer circuit 20A reads the control data signal for driving the solenoid A3 which is stored in the buffer of the serial communication interface 23 and on the basis of the control data thereof, generates a PWM signal for driving the solenoid A3 and a high or low signal for driving the relay switch A4.

Further, the control data signal for driving the relay switch A4 is directly read by the gate control/protection diagnostic circuit 21 to generate a high or low signal for driving the relay switch A4. For example, when 8 relay switches A4 are installed, the serial data received by the serial communication interface 23 is 8-bit data. Each bit corresponds to each of the 8 relay switches A4. For example, if the first bit corresponds to the first relay switch A4, when the first bit is 0, to the gate terminal of the first power transistor for driving the first relay switch, a low-level signal is supplied, thus the first relay switch is turned off. When the first bit is 1, to the gate terminal of the first power transistor for driving the first relay switch, a high-level signal is supplied, thus the first relay switch is turned on.

For the serial communication mentioned above, for example, a serial peripheral interface (SPI) which is a kind of clock synchronization type serial communication may be used.

Next, the constitution of the timer circuit 20A of the timer-built-in driver IC 2A will be explained below.

Figure 2:
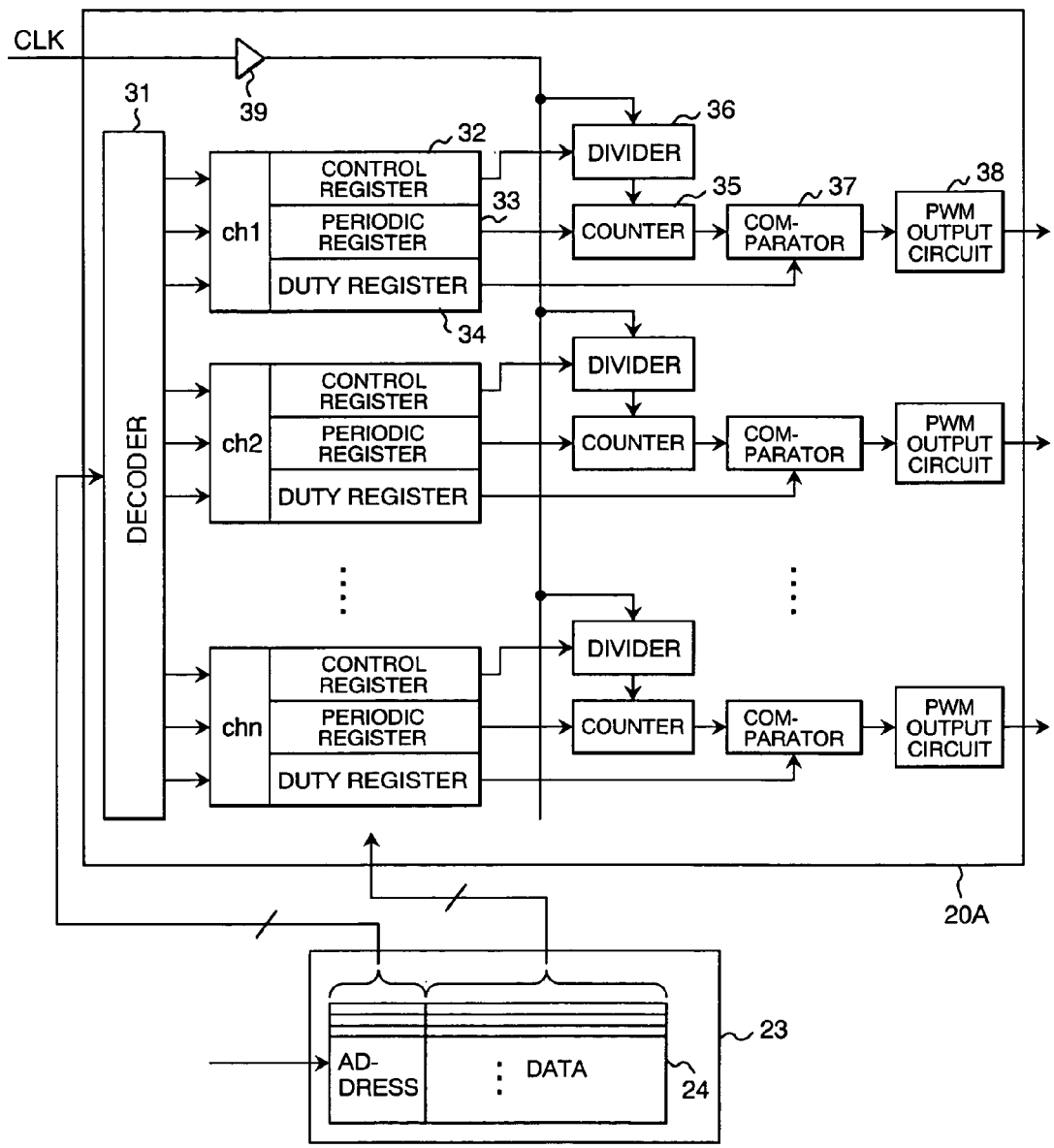
FIG. 2 is a block diagram showing the constitution of the essential section of the driver IC 2A used in the electronic control unit for automobiles of the first embodiment of the present invention.

FIG. 2 is a block diagram showing the constitution of the essential section of the driver IC 2A used in the electronic control unit for automobiles of the first embodiment of the present invention.

The timer circuit 20A, for each of n channels ch1, ch2, - - -, and chn, has a control register 32, a periodic register 33, a duty register 34, a counter 35, a divider 36, a comparator 37, and a PWM output circuit 38.

A CLK signal distributed to the driver IC 20A through a buffer 39 is divided by the divider 36 and in synchronization with the divided CLK signal, the counter 35 is incremented. Further, the counter 35 may be of a decrement type.

To the control register 32, the periodic register 33, and the duty register 34 of each channel, addresses are respectively assigned and the register designated by the microcomputer 1 is selected by a decoder 31. The registers are sequentially assigned such that, for example, the control register 32 of the channel ch1 is assigned to an address 0000, and the periodic register 33 of the channel ch1 is assigned to an address 0001, and the duty register 34 of the channel ch1 is assigned to an address 0010, and the control register 32 of the channel ch2 is assigned to an address 0011.

The microcomputer 1 transmits the address of a register to be accessed and the data to be written into the register as a frame and it is stored in a receiving buffer 24 of the serial communication interface 23.

In the control resister 32, the division ratio of the divider 36 and the polarity of a PWM output signal are set. Further, in periodic register 33, a digital value equal to "desired period of a PWM output signal"/"increment or decrement period of the counter by the divided CLK signal" is set. Assuming the "desired period of a PWM output signal" as, for example, T0 and the "increment or decrement period of the counter by the divided CLK signal", that is, the period of the CLK signal as t0, in the periodic register 33, T0/t0 is set. When the counter 35 counts the CLK signal in correspondence to this value (T0/t0), it can be judged that a desired period of the PWM output signal elapses. Furthermore, in the duty register 34, a digital value equal to "desired length of the high period or low period of a PWM output signal"/"increment or decrement period of the counter by the divided CLK signal". Assuming the "desired length of the high period or low period of a PWM output signal" as T1 and the "increment or decrement period of the counter by the divided CLK signal"as t0, in the periodic register 33, T1/t0 is set. When the counter 35 counts the CLK signal in correspondence to this value (T1/t0), it can be judged that a desired high period (or lower period) of the PWM output signal elapses. Here, T1/T0 becomes on-duty (or off-duty) of the PWM output signal.

Next, the generation operation of a PWM output signal by the timer circuit 20A will be explained. When the value of the counter 35 becomes equal to the value (T0/t0) set in the periodic register 33, the counter is reset and the output is simultaneously inverted from low to high. Next, at the point of time when it is judged by the comparator 37 that the value of the counter 35 coincides with the value (T1/t0) set in the duty register 34, the output is changed from high to low. When the value of the counter 35 becomes equal to the value (T0/t0) set in the periodic register 33 again, the counter is reset and the output is simultaneously inverted from low to high. By doing this, a PWM signal having a period of T0 and a high period (or low period) of T1 is generated and it is outputted from the PWM output circuit as a PWM output signal.

Next, the constitution and operation of the timer-built-in driver IC 2B shown in FIG. 1 will be explained below. The driver IC 2B has the timer circuit 20B, the gate control/protection diagnostic circuit 21, the output driver 22, and the serial communication interface 23. The constitution other than the timer circuit 20B is the same as that of the timer 2A.

The timer circuit 20B, on the basis of a control data signal for driving the injector A1 and the igniter A2 which is transferred from the microcomputer 1 via the serial communication interface 15 and the serial communication interface 23, generates a pulse signal for driving the injector A1 and the igniter A2.

To the timer circuit 20B, in addition to the clock signal (CLK signal), an engine rotation synchronization signal (Sync signal) for deciding the timing of fuel injection or ignition is input from the microcomputer 1. The Sync signal is a signal generated by the timer circuit 13 of the microcomputer 1 by discriminating the piston position of each cylinder of the engine on the basis of a crank angle sensor signal S1 and a cam angle sensor signal S2 which are input to the microcomputer 1.

Next, an example of the Sync signal will be explained by referring to FIG. 3.

Figure 3:
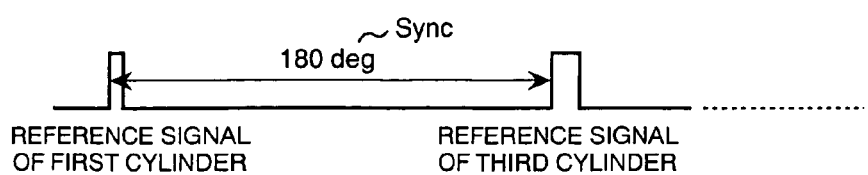
FIG. 3 is an illustration of the Sync signal used in the electronic control unit for automobiles of the first embodiment of the present invention.

FIG. 3 is an illustration of the Sync signal used in the electronic control unit for automobiles of the first embodiment of the present invention. Here, an example of a four-cylinder engine will be explained.

As shown in the drawing, every 180° of a crank angle, a pulse signal indicating the reference position of a specific piston of each cylinder is outputted from the timer circuit 13 of the microcomputer 1. As shown in the drawing, for example, when the pulse width of the reference signal of the first cylinder is made narrower than the pulse width of the reference signal of the third cylinder and the pulse width indicating the reference piston position is changed for each cylinder, even a driver IC having no CPU can discriminate the cylinder.

Next, the constitution of the timer circuit 20B of the timer-built-in driver IC 2B will be explained by referring to FIG. 4.

Figure 4:
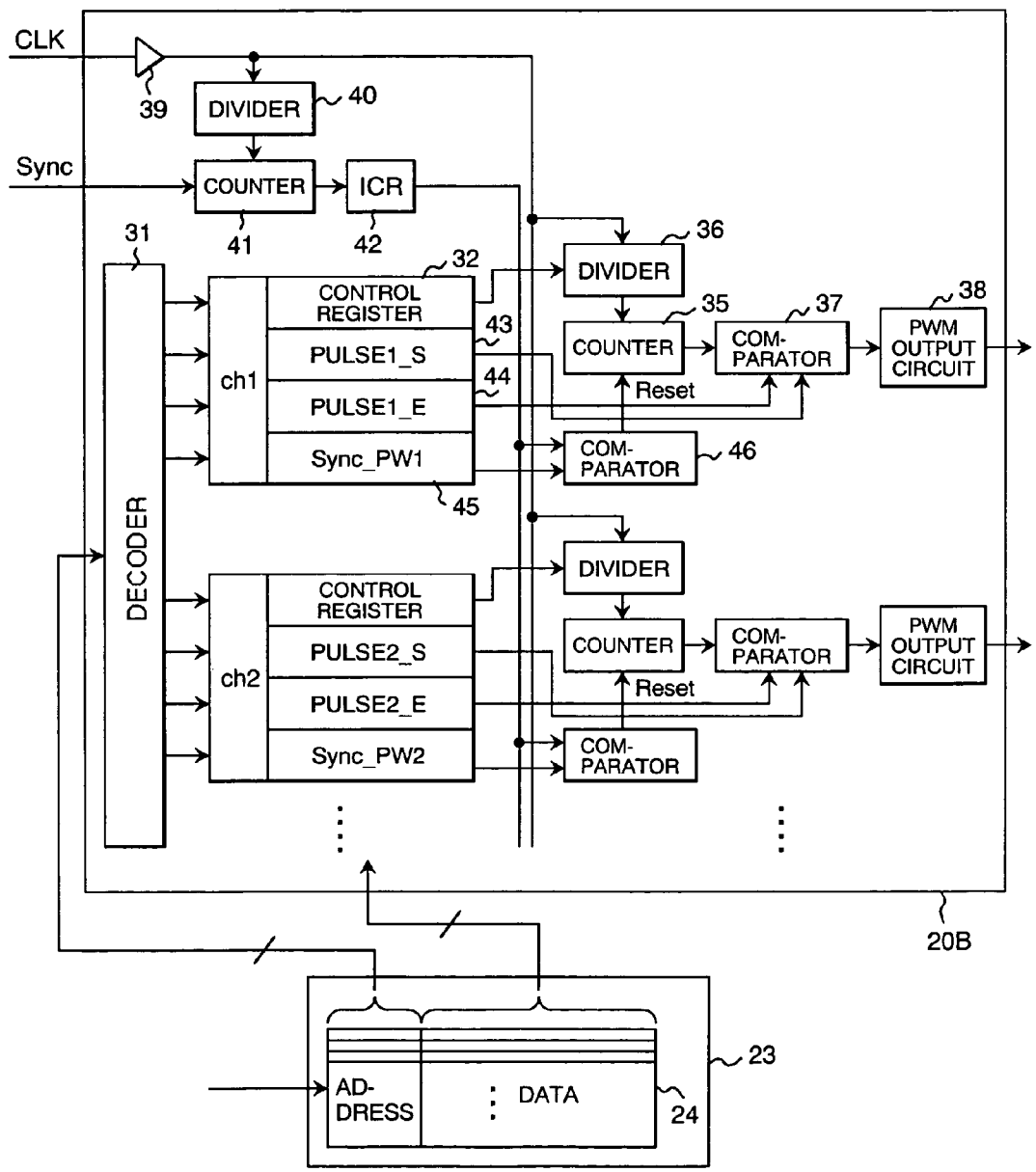
FIG. 4 is a block diagram showing the constitution of the essential section of the driver IC 2B used in the electronic control unit for automobiles of the first embodiment of the present invention.

FIG. 4 is a block diagram showing the constitution of the essential section of the driver IC 2B used in the electronic control unit for automobiles of the first embodiment of the present invention.

The timer circuit 20B, for each of channels ch1, ch2, - - -, has a control register 32, a pulse generation start register (PULSE#_S) 43, a pulse generation end register (PULSE#_E) 44, a register (Sync_PW#) 45 storing the Sync signal pulse width of each cylinder, the counter 35, the comparator 46 for resetting the counter 35, the divider 36, the comparator 37, and the pulse output circuit 38.

The CLK signal passes the buffer 39 and the dividers 36 and 40 and is distributed to the counter 35 for generating a pulse signal and the counter 41 for measuring the Sync signal pulse width. The input capture register (ICR) 42 captures the value of the counter 41 at the edge of the Sync signal pulse.

To the control register 32, the PULSE#_S register 43, the PULSE#_E register 44, and the Sync_PW# register 45 of each channel, addresses are respectively assigned and the register designated by the microcomputer 1 is selected by the decoder 31. The microcomputer 1 transmits the address of the register to be accessed and the data to be written into the register as a frame and it is stored in the receiving buffer 24 of the serial communication interface 32.

In the control resister 32, the division ratio of the divider 36 and the polarity of a pulse output signal are set. Further, in the PULSE#_S register 43 and the PULSE#_E register 44, the pulse generation timing and pulse end timing based on the Sync signal pulse are respectively set and in the Sync_PW# register 45, for each cylinder, the pulse width of the Sync signal corresponding to the cylinder is set.

Next, by referring to FIG. 5, an example of the generation method of a pulse output signal will be explained.

FIG. 5 is a timing chart showing the generation operation of a pulse output signal by the timer circuit 20B of the electronic control unit for automobiles of the first embodiment of the present invention.

The counter 41 for measuring the Sync pulse width counts up in synchronization with the divided clock signal. And, as shown in FIG. 5(B), at the time t1, the counter is reset at the leading edge of the Sync signal. After reset, the counter starts count up again. And, as shown in FIG. 5(B), at the time t2, the counter value at the point of time of the trailing edge of the Sync signal is captured by the ICR 42.

As shown in FIGS. 5(C) and 5(D), the pulse generation counter 35 also counts up in synchronization with the divided clock signal. However, when the value captured by the ICR 42 is equal to the value written in the Sycn_PW of the same channel, as shown in FIG. 5(C), at the time t2, the counter is reset at the trailing edge of the Sync signal. In the example shown in the drawing, the pulse width of the reference signal of the first cylinder of the Sync signal coincides with the value of the Sync_PW1 of the channel 1, so that only the counter 35-1 of the channel 1 is reset at the trailing edge of the Sync signal.

As shown in FIG. 5(C), the counter 35-1, after reset, starts count up again, and at the time t3, when the value coincides with the value of the PULSE_S register 43., the port output is inverted from low to high, and as shown in FIG. 5(E), pulse signal output is started.

Next, as shown in FIG. 5(C), at the time t4, when the value of the counter 35-1 coincides with the value of the PULSE1_E register 44, the port output is changed from high to low, and the pulse signal output is finished. Further, when a plurality of sets of PULSE#_S registers and PULSE#_E registers are installed, the control unit can respond to multi-stage of fuel injection and ignition.

As mentioned above, the ignition and fuel injection time based on a specific piston position and the pulse width can be freely controlled for each cylinder. Further, as a generation method of a pulse signal, as mentioned above, not only a control data signal for setting the pulse signal output start timing and output end timing is used but also a control data signal for setting the pulse signal output start timing and pulse width may be used.

Further, in the above explanation, the driver IC 2A has the timer circuit 20A and the driver IC 2B has the timer circuit 20B. However, both the driver ICs 2A and 2B can have both the timer circuits 20A and 20B. By doing this, the driver ICs can be shared, so that the mass productivity is improved and an inexpensive constitution can be realized. In this case, at the time of initialization of the electronic control unit, either of the solenoid and relay driving timer function (20A) and the injector and igniter driving timer function (20B) can be selected. Further, the timer circuits can be structured so as to select two functions for each channel.

According to this embodiment explained above, by use of the timer-built-in driver IC 2A, there is no need to individually control the power transistors for driving the loads of the solenoid and relay in on and off from the microcomputer, so that the number of wires between the microcomputer and the output driver circuit can be reduced. Namely, for example, assuming eight solenoids and relays which are actuators to be respectively installed, in order to drive the eight solenoids and eight relays, 16 wires and serial communication lines for diagnosis are required. However, in this embodiment, wires are required only for the CLK signal lines and serial communication lines and even if the number of actuators is increased, the number of wires will not be increased.

Further, the number of timer ports of the microcomputer can be reduced, so that an inexpensive microcomputer having a smaller package can be used. Further, when the number of actuators to be controlled is increased, in a conventional system, the timer ports of the microcomputer are insufficient, so that the microcomputer must be graded up. However, in this embodiment, there is no need to grade up the microcomputer and increase the number of wires, so that the control system can be expanded easily.

Furthermore, the microcomputer supplies the clock signal to the driver ICs, thus the driver ICs themselves does not need to have an oscillator for timer count, so that the timer-built-in drivers IC can be produced at a low price.

Further, using the timer-built-in driver IC 2B, the microcomputer 1 notifies the timer-built-in driver IC 2B of the piston reference position of each cylinder using the Sync signal, so that the driver ICs do not need to have a built-in CPU and the power transistors for driving the injector and igniter can be controlled from the microcomputer via the serial communication line. Therefore, the microcomputer does not need to individually control the power transistors in on and off, so that the number of wires between the microcomputer and the output driver circuit can be reduced greatly. For example, in a 6-cylinder engine, 6 injectors and 6 ignition plugs are generally installed, so that between the microcomputer and the driver ICs, 12 wires and serial communication lines for diagnosis are required, while in this embodiment, only the CLK signal lines, Sync signal lines, and serial communication lines are required. Moreover, even if the number of cylinders is increased like the 12-cylinder engine, the number of wires will not be increased.

With respect to the microcomputer, the timer circuit may output only the Sync signal, thus the area thereof can be made smaller and the number of timer ports can be simultaneously reduced greatly, so that an inexpensive microcomputer having a smaller package can be used.

Even if either of the driver ICs 2A and 2B is used, the logic parts of the driver ICs are increased in correspondence to the timer circuits, though the number of input ports is decreased, so that the whole chip area is almost the same as the conventional one. Therefore, by both the cost decrease of the microcomputer and the cost decrease of the substrate due to the reduction in the number of wires, a decrease in the total cost of the electronic control unit can be realized.

Next, the constitution of the electronic control unit for automobiles relating to the second embodiment of the present invention will be explained below with reference to FIGS. 6 and 7.

Firstly, by referring to FIG. 6, the whole constitution of the electronic control unit for automobiles of this embodiment will be explained.

Figure 6:
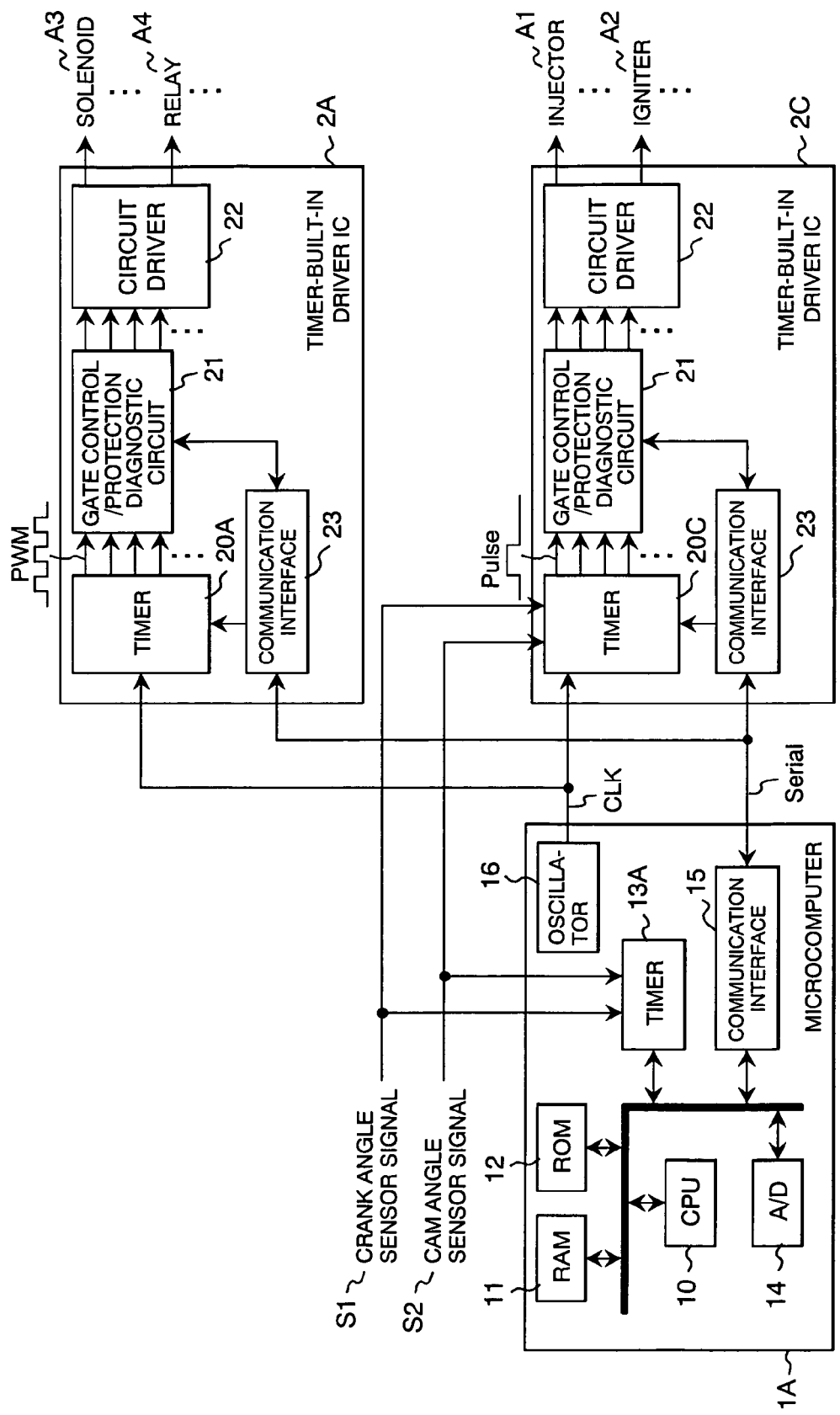
FIG. 6 is a block diagram showing the whole constitution of the electronic control unit for automobiles of the second embodiment of the present invention.

FIG. 6 is a block diagram showing the whole constitution of the electronic control unit for automobiles of the second embodiment of the present invention. Further, the same numerals as those shown in FIG. 1 indicate the same parts.

In this embodiment, the differences from the constitution shown in FIG. 1 are a timer circuit 13A of a microcomputer 1A and a timer circuit 20C of a timer-built-in driver IC 2C. The crank angle sensor signal S1 and the cam angle sensor signal S2 are input to not only the timer circuit 13A of the microcomputer 1A but also the timer circuit 20C of the timer-built-in driver IC 2C for driving the injector A1 and the igniter A2. The timer circuit 20C is structured, on the basis of these sensor signals, so as to decide the piston reference position of each cylinder of the engine and output a pulse signal in synchronization with it. Therefore, unlike FIG. 1, from the timer 13A of the microcomputer 1A, the Sync signal is not transmitted to the timer-built-in driver IC 2C.

Next, by referring to FIG. 7, the constitution of the timer circuit 20C of the timer-built-in driver IC 2C will be explained.

Figure 7:
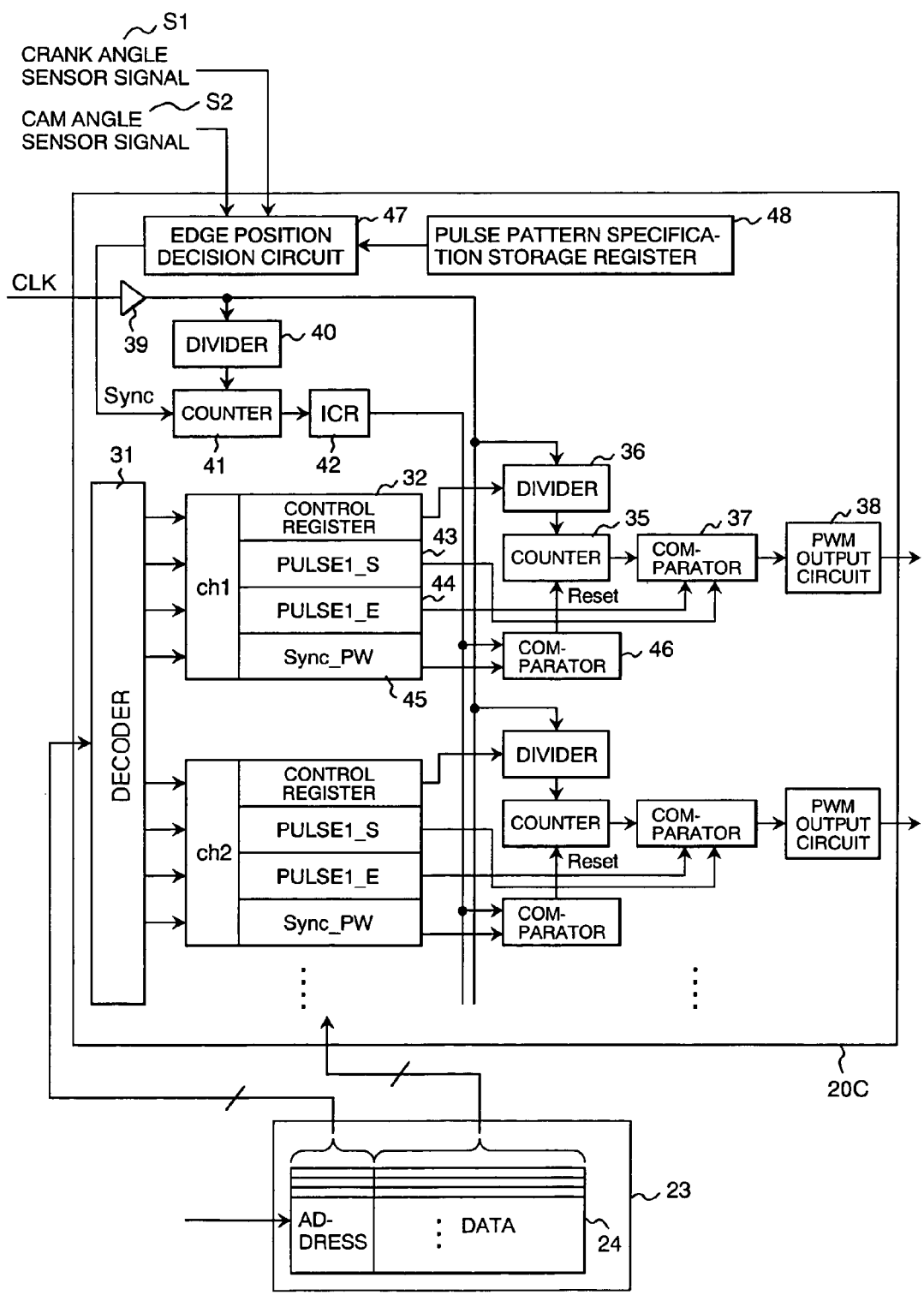
FIG. 7 is a block diagram showing the constitution of the essential section of the driver IC 2C used in the electronic control unit for automobiles of the second embodiment of the present invention.

FIG. 7 is a block diagram showing the constitution of the essential section of the driver IC 2C used in the electronic control unit for automobiles of the second embodiment of the present invention. Further, the same numerals as those shown in FIG. 4 indicate the same parts.

With respect to the timer circuit 20C, to the timer circuit 20B shown in FIG. 4, an engine position decision circuit 47 for generating the Sync signal on the basis of the crank angle sensor signal S1 and the cam angle sensor signal S2 and a pulse pattern specification storage register 48 are added.

The crank angle sensor signal S1 and the cam angle sensor signal S2 are input to the engine position decision circuit 47. The engine position decision circuit 47 generates the Sync signal by discriminating the piston position of each cylinder of the engine and supplies it to the counter 41 for measuring the Sync pulse width. The operations other than it are the same as those of the timer circuit 20B shown in FIG. 4. The pulse patterns of the crank angle sensor and cam angle sensor depend on the engine, so that at the time of initialization, the microcomputer can set the pulse pattern specification of the engine to be controlled in the pulse pattern specification storage register 48.

Even in this embodiment explained above, the number of wires between the microcomputer and the output driver circuit can be reduced.

Further, the number of timer ports of the microcomputer can be reduced, so that an inexpensive microcomputer having a smaller package can be used and there is no need to grade up the microcomputer and increase the number of wires, so that the control system can be expanded easily.

Furthermore, the microcomputer supplies the clock signal to the driver ICs, thus the driver ICs themselves do not need to have an oscillator for timer count, so that a timer-built-in driver ICs can be produced at a low price.

The constitution of the electronic control unit for automobiles relating to the third embodiment of the present invention will be explained below with reference to FIG. 8.

Figure 8:
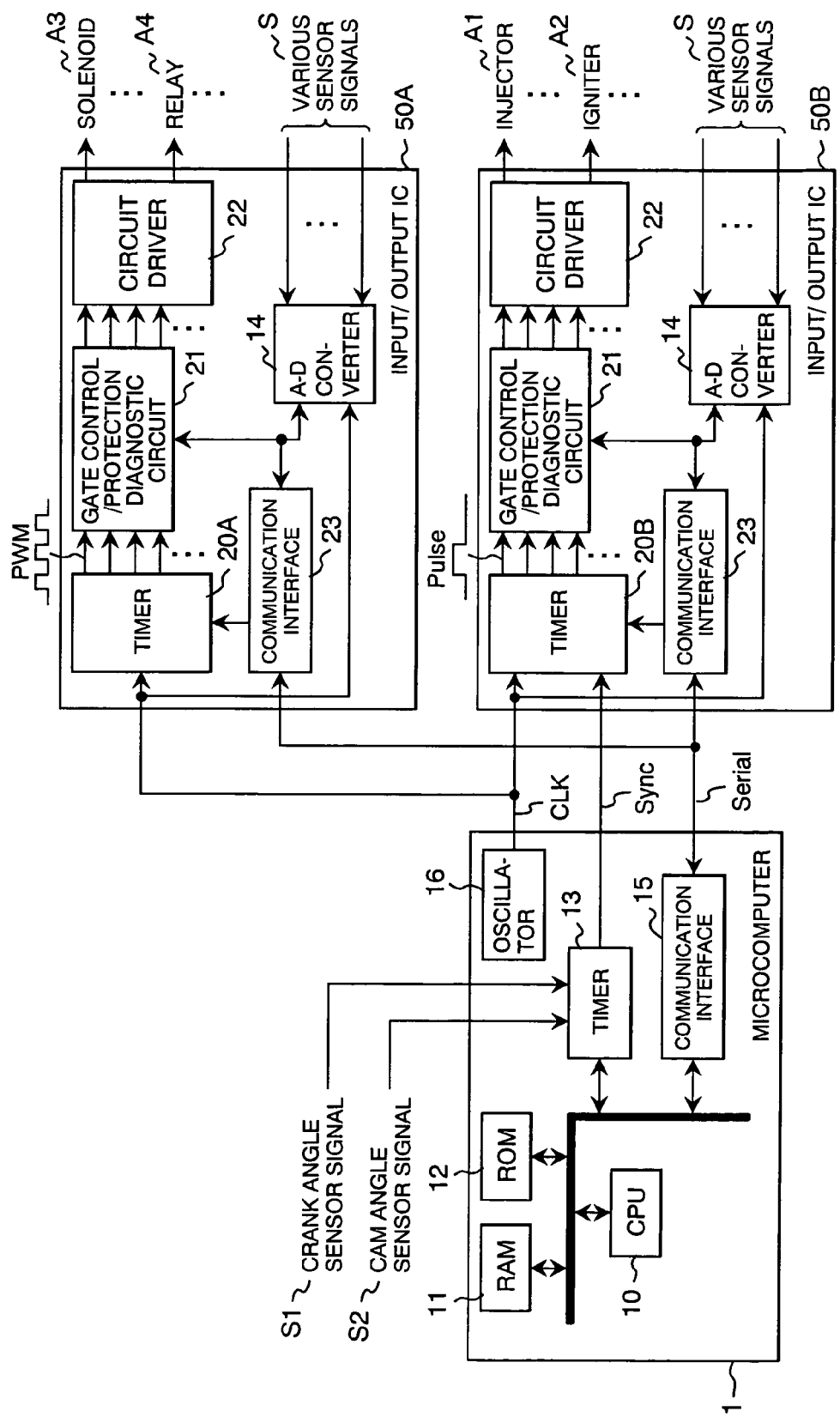
FIG. 8 is a block diagram showing the whole constitution of the electronic control unit for automobiles of the third embodiment of the present invention.

FIG. 8 is a block diagram showing the whole constitution of the electronic control unit for automobiles of the third embodiment of the present invention. Further, the same numerals as those shown in FIG. 1 indicate the same parts.

In this embodiment, the difference from the constitution shown in FIG. 1 is input/output ICs 50A and 50B. The input/output ICs 50A and 50B are respectively the timer-built-in driver ICs 2A and 2B shown in FIG. 1 having the built-in A-D converter 14. Various sensor signals S are input to the A-D converters 14 of the input/output ICs 50A and 50B. The A-D conversion results are transmitted to the microcomputer 1A via the serial communication interfaces 23 and 15. Further, the clock signal CLK for timer count is supplied to the A-D converter 14.

According to this embodiment, the A-D converts and A-D input ports of the microcomputer 1A can be reduced, so that the chip area and the number of ports of the microcomputer can be reduced more. Further, by the architecture of forming the microcomputer core such as the CPU and memory and the input/output circuit such as the timer and A-D converter in different chips, an optimal semiconductor process can be applied to each chip. Particularly, a finer process can be applied to the CPU core and memory than the process of a 1-chip microcomputer having a core and a peripheral input/output circuit which are integrated, so that the operation is speeded up and the control application program including the model base control can be executed at high speed.

Next, the constitution of the electronic control unit for automobiles relating to the fourth embodiment of the present invention will be explained below with reference to FIG. 9.

Figure 9:
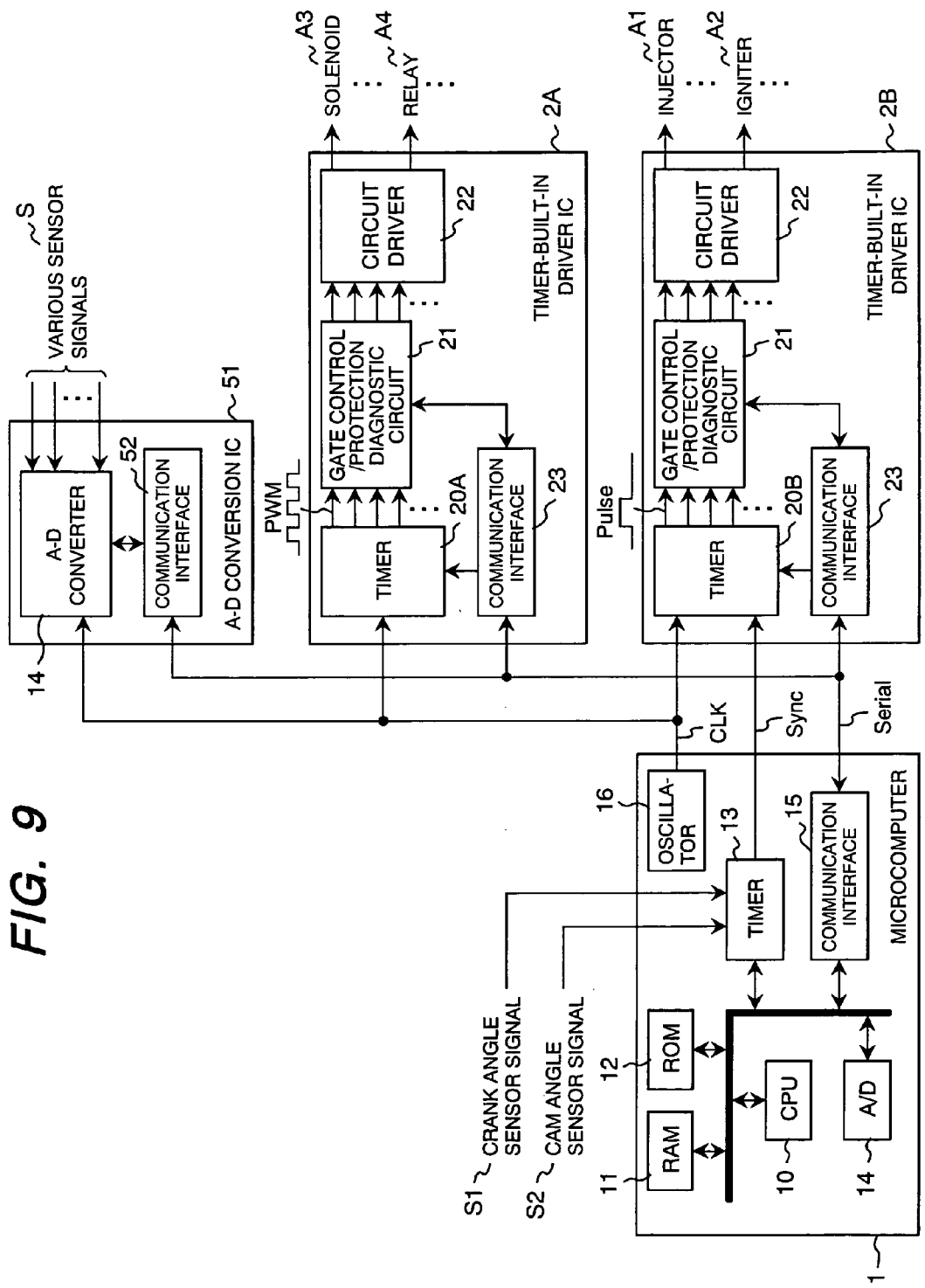
FIG. 9 is a block diagram showing the whole constitution of the electronic control unit for automobiles of the fourth embodiment of the present invention.

FIG. 9 is a block diagram showing the whole constitution of the electronic control unit for automobiles of the fourth embodiment of the present invention. Further, the same numerals as those shown in FIG. 1 indicate the same parts.

In this embodiment, the difference from the constitution shown in FIG. 8 is a respect that an A-D conversion IC 51 is formed in a different chip from that of the output driver circuits 2A and 2B. The A-D conversion IC 51 is composed of the A-D converter 14 and a serial communication interface 52 and transmits A-D conversion values of various sensor signals S to a microcomputer 1D by serial communication. This constitution is suitable particularly when there is the possibility that electrical noise generated by the output driver circuits 2A and 2B supplying a large current may degrade the A-D conversion accuracy.

According to this embodiment, the same effects as those of the embodiment shown in FIG. 8 can be obtained and moreover the A-D conversion accuracy is improved.

According to the present invention, the number of wires from the microcomputer to the driver ICs can be reduced and the actuators can be driven without the microcomputer being built in.

Reference signs used in the drawing means the following.

1, 1A: Microcomputer, 2A, 2B, 2C: Driver IC, 14: A-D converter, 15, 23, 52: Serial communication interface, 20A, 20B, 20C: Timer circuit, 21: Gate control/protection diagnostic circuit, 22: Output driver, 24: Receiving buffer, 50A, 50B: Input/output IC, 51: A-D conversion IC, A1: Injector, A2: Igniter, A3: Solenoid, A4: Relay.

What is claimed is:

1. An electronic control unit for automobiles comprising:
   a microcomputer for generating a plurality of control signals for controlling a state of an automobile on the basis of input signals from a plurality of sensors; and
   plural output driver circuits for driving a plurality of actuators in response to said control signals generated by said microcomputer, said output drive circuits being separated from said microcomputer, and electrically connected to said microcomputer through a serial communication line, a clock signal line and a synchronized signal line; wherein,
   said output drive circuits include a first output drive circuit for an actuator controlled by a pulse width modulation signal, and a second output drive circuit for an actuator controlled by a pulse signal that is synchronized with engine rotation;
   each of said output drive circuits comprises a driver IC which has integrated therein power transistors corresponding to a plurality of channels, a serial communication interface for executing serial communication with said microcomputer, and a timer circuit for generating said pulse width modulation signal or said pulse signal for said power transistors;
   said microcomputer is configured to supply a clock signal for timer count generated by a microcomputer-side oscillator to said timer circuits of said first and second output drive circuits via said clock signal line, transmit a first control data signal for setting a frequency and duty factor of said pulse width modulation signal to said first output drive circuit via said serial communication line, transmit a second control data signal for setting output start timing and output end timing or output start timing and pulse width of said pulse signal to said second output drive circuit via said serial communication line, and supply an engine rotation synchronized signal generated at said microcomputer-side, based on a crank angle sensor signal and a cam angle sensor signal, via said synchronized signal line;
   said timer circuit of said first output drive circuit generates said pulse width modulation signal based on said first control data signal received from said microcomputer by said serial communication interface; and
   said timer circuit of said second output drive circuit generates said pulse signal on the basis of the second control data signal received from said microcomputer by said serial communication interface and said engine rotation synchronized signal supplied from said microcomputer.

2. The electronic control unit for automobiles according to claim 1, wherein;
   said microcomputer supplies said clock signal for timer count to said timer circuit built in said driver IC; and
   said timer circuit generates said pulse width modulation signal, based on said first control data signal.

3. The electronic control unit for automobiles according to claim 1, wherein said engine rotation synchronized signal is a pulse signal indicating that the piston of each cylinder of said engine is positioned at a specific reference point and the pulse width of said signal depends on the cylinder number.

4. The electronic control unit for automobiles according to claim 1, wherein:
   said microcomputer supplies said clock signal for timer count to said timer circuit in said driver IC; and
   based on said signals of said crank angle sensor and cam angle sensor which are input to said timer circuit, said timer circuit discriminates the position of each cylinder of said engine, and generates a pulse width modulation signal based on said first control data signal transmitted from said microcomputer.

5. The electronic control unit for automobiles according to claim 4, wherein said timer circuit built in said driver IC has a register for storing a specification for pulse patterns of said crank angle sensor signal and said cam angle sensor signal.

6. The electronic control unit for automobiles according to claim 1, wherein said driver IC additionally has an integrated A-D converter, converts a sensor signal to a digital signal by said A-D converter, and transmits a conversion result to said microcomputer via said serial communication.

7. electronic control unit for automobiles according to claim 1, further comprising, in addition to said driver IC, an A-D conversion IC composed of an A-D converter and a serial communication interface, wherein an A-D conversion result by said A-D converter is transmitted to said microcomputer via said serial communication.

* * * * *